United States Patent [19]

Fischer et al.

[11] Patent Number: 4,669,595
[45] Date of Patent: Jun. 2, 1987

[54] CLUTCH DISC FOR A MOTOR VEHICLE FRICTION CLUTCH

[75] Inventors: Matthias Fischer, Euerbach; Franz Hartig, Dittelbrunn; Dieter Bernhard, Schwebheim; Hilmar Göbel, Grafenrheinfeld, all of Fed. Rep. of Germany

[73] Assignee: Fichtel & Sachs AG

[21] Appl. No.: 728,605

[22] Filed: Apr. 29, 1985

[30] Foreign Application Priority Data

Apr. 28, 1984 [DE] Fed. Rep. of Germany ....... 3415926

[51] Int. Cl.$^4$ ............................ F16D 3/14; F16D 3/66
[52] U.S. Cl. ..................................... 192/106.2; 464/68
[58] Field of Search ............... 192/106.2, 106.1, 70.17; 464/64, 68

[56] References Cited

U.S. PATENT DOCUMENTS

| | | |
|---|---|---|
| 3,327,820 | 6/1967 | Maurice ........................ 192/106.2 X |
| 3,863,747 | 2/1975 | Werner et al. ................... 192/106.2 |
| 3,931,876 | 1/1976 | Beeskow et al. ................. 192/106.2 |
| 3,983,982 | 10/1976 | Wörner ............................ 192/106.2 |
| 4,122,931 | 10/1978 | Maucher ......................... 192/106.2 |
| 4,406,357 | 9/1983 | Nagano et al. .................. 192/106.2 |
| 4,485,907 | 12/1984 | Nishimura ....................... 192/106.2 |
| 4,520,915 | 6/1985 | Strub .............................. 192/106.2 |
| 4,533,031 | 8/1985 | Nagano ........................... 192/106.2 |
| 4,549,641 | 10/1985 | Ootani et al. .................... 192/106.2 |
| 4,569,430 | 2/1986 | Raab et al. ...................... 192/106.2 |

FOREIGN PATENT DOCUMENTS

| | | |
|---|---|---|
| 1600194 | 1/1970 | Fed. Rep. of Germany . |
| 2508878 | 10/1975 | Fed. Rep. of Germany . |
| 2418062 | 8/1983 | Fed. Rep. of Germany . |
| 1200013 | 7/1970 | United Kingdom ............ 192/106.2 |

Primary Examiner—Rodney H. Bonck
Assistant Examiner—Richard M. Lorence
Attorney, Agent, or Firm—Toren, McGeady & Associates

[57] ABSTRACT

Clutch disc for a motor vehicle friction clutch comprises a hub and a disc part enclosing the hub and coupled with predetermined play in rotation but otherwise non-rotatably with the hub. Side discs on axially opposite sides of the disc part form one unit mounted on the hub rotatably through a limited first angle relative to the disc part. The disc part is coupled rotationally elastically with the hub through at least one spring of an idling vibration damper. Several springs of an under-load vibration damper, arranged in windows of the disc part and of the two side discs, couple the side discs rotationally elastically with the disc part. The under-load vibration damper comprises a friction device having two control discs arranged on axially opposite sides of the disc part between the disc part and one each of the two side discs. The control discs are connected non-rotatably with one another. Relative rotation between the control discs and the disc part is limited to a second angle of rotation smaller than the first angle of rotation. At least one of the two control discs comprises at least one radially protruding extension co-operating with one of the springs of the under-load vibration damper.

6 Claims, 4 Drawing Figures

CLUTCH DISC FOR A MOTOR VEHICLE FRICTION CLUTCH

BACKGROUND OF THE INVENTION

The invention relates to a clutch disc for a motor vehicle friction clutch and particularly a clutch disc with separate torsional vibration dampers for operation in idling and operation under load.

STATEMENT OF PRIOR ART

From German Publication Specification No. 25 08 878 there is known a clutch disc for a motor vehicle friction clutch with the hub of which a substantially radially protruding disc part is coupled non-rotatably but with play in rotation through a toothing. In the region of the toothing there are arranged springs of an idling vibration damper which connect the disc part rotationally elastically with the hub. Axially on both sides of the disc part there are arranged side discs which are connected together with clutch friction linings into one unit and are mounted on the hub rotatably through a limited angle of rotation in relation to the disc part. In windows of the disc part and of the two side discs there are arranged springs of an under-load vibration damper which connect the two side discs rotationally elastically with the disc part. Between the side discs and the disc part there is further provided a friction device which damps the torsional vibrations. The friction device is effective with constant friction torque in the entire working range of the under-load vibration damper.

Another clutch disc for a motor vehicle friction clutch is known from German Publication Specification No. 1,600,194. This clutch disc comprises a hub integrally provided with a hub disc. Axially on both sides of the hub disc, side discs are mounted rotatably on the hub and are connected together with clutch friction linings into one unit. In windows of the side disc and of the hub disc there are arranged springs of an idling vibration damper and of an under-load vibration damper, which couple the side discs rotationally elastically with the hub disc. The springs of the under-load vibration damper are seated in windows of the hub disc which are enlarged in the circumferential direction so that the under-load vibration damper becomes effective only after the exceeding of a predetermined angle of rotation which defines the working range of the idling vibration damper. In this known clutch disc the idling vibration damper is also effective in the working range of the under-load vibration damper, which necessitates comparatively large and heavily stressed springs of the idling system.

The under-load vibration damper of the clutch disc known from German Publication Specification No. 1,600,194 further comprises friction devices both for the idling vibration damper and for the under-load vibration damper. The friction devices are seated axially side-by-side. The friction device of the under-load vibration damper comprises a control disc which is coupled with radially protruding extensions to the spring, movably seated in the window of the hub disc, of the under-load vibration damper and engages with an axially bent-over tab in an opening of the hub disc. The tab permits a play in rotation of the control disc corresponding to the idling rotation play, so that the friction device is effective exclusively in operation under load. The friction device of the under-load vibration damper can also be of multi-stage construction, in which case additional control discs dimensioned for different relative angles of rotation are necessary.

From German Patent No. 2,418,062 a clutch disc for a motor vehicle friction clutch is known the under-load vibration damper of which comprises a friction device providing for a friction torque which depends on the rotation direction. From a hub of the clutch disc a hub disc protrudes radially. Side discs are mounted rotatably on the hub axially on both sides of the hub disc. The side discs are connected together with clutch friction linings into one unit. Springs of the under-load vibration damper which connect the side discs rotationally elastically with the hub disc are seated in windows of the hub disc and of the side discs. Axially between one of the side discs and the hub disc there is arranged a control disc which engages with a tab between an end face of the spring, facing in the circumferential direction, and an end face of the window of the hub disc. A first friction ring is seated between the control disc and the adjacent side disc and a second friction ring is seated between the control disc and the hub disc. The torque transmittable by the second friction ring is smaller than the torque transmittable by the first friction ring. Since the control disc is positively rotated in only one direction of rotation as a result of the tab engaging in the window of the hub disc, the friction torques of the two friction rings are effective in different relative directions of rotation of the side discs and the hub disc.

OBJECT OF THE INVENTION

The present invention is directed towards provision of a clutch disc for a motor vehicle friction clutch which comprises both an idling vibration damper and an under-load vibration damper, the under-load vibration damper comprising a two-stage friction device.

SUMMARY OF THE INVENTION

The clutch disc in accordance with the invention comprises a hub and a disc part enclosing the hub and protruding substantially radially from it. The disc part is coupled through a toothing with predetermined play in roration but otherwise non-rotatably with the hub. The disc part is coupled with the hub through at least one spring of an idling vibration damper. The play in rotation of the toothing determines the working angle of the idling vibration damper. After this play in rotation is taken up the idling vibration damper is bridged over, so that it is not stressed in operation under load.

Axially on both sides of the disc part there are arranged side discs which are connected into one unit and carry clutch friction linings. The side discs are mounted on the hub rotatably through a limited first angle of rotation in relation to the disc part. Springs of an under-load vibration damper which couple the side discs rotationally elastically with the disc part are seated in windows of the disc part and of the side discs. The under-load vibration damper comprises a two-stage friction device having two control discs arranged on axially opposite sides of the disc part between the disc part and one each of the side discs. The control discs are connected non-rotatably with one another through connecting elements passing axially through openings of the disc part, particularly through axial tabs of one of the two control discs. The connecting elements and the associated openings of the disc part limit the relative rotation between the control discs and the disc part to a second angle of rotation smaller than the first angle of rotation. At least one of the two control discs, preferably both control discs, comprises or comprise at least one radially protruding extension co-operating with one of the springs of the under-load vibration damper. First friction rings are arranged between each of the side discs and the axially adjacent control disc. A thrust ring coupled non-rotatably but axially displaceably with the control disc is provided between a first one of the two control discs and the disc part. Furthermore second friction rings are provided both axially between a second one of the two control discs and the disc part and axially between the thrust ring and the disc part. An axially acting spring which axially loads the friction rings is provided axially between the first control disc and the thrust ring.

In spite of being a comparatively simple assembly, such a clutch disc has three damping ranges of different characteristics which come into action successively in the relative rotation of the side discs and the hub. The characteristics of the damping ranges can be dimensioned without problem. The friction device of the under-load vibration damper is accommodated in the construction space radially between the springs of the under-load vibration damper and of the idling vibration damper.

In a first preferred embodiment all friction rings of the friction device of the under-load vibration damper are loaded axially by one single spring. In order to achieve different friction characteristics of the two stages of the friction device, the friction coefficients of the first friction rings are greater than the friction coefficients of the second friction rings.

Different friction characteristics of the two stages of the friction device can also be achieved by a second axially acting spring. In this case the second spring is braced in between the first control disc and stop shoulders formed on the connection elements or tabs of the two control discs. The second spring increases the friction torque of the first friction rings and is preferably designed for a higher pressing force than the first mentioned spring of the friction device. In addition, in the case of this configuration again the friction coefficient of the first friction rings can be greater than the friction coefficient of the second friction rings.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
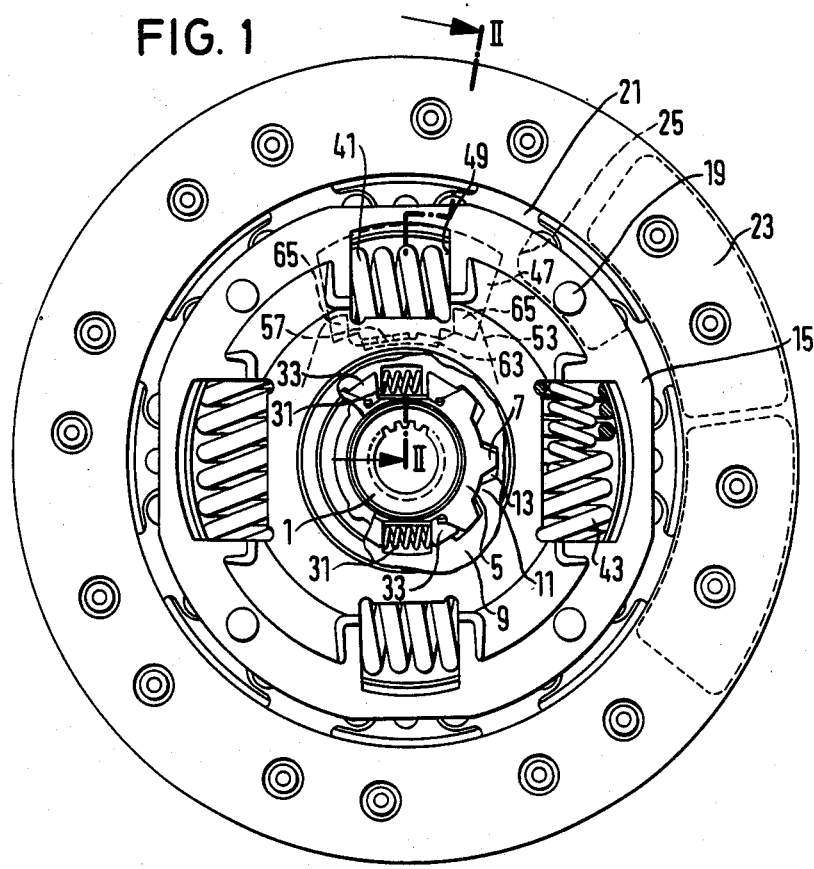
FIG. 1 shows an axial view of a clutch disc in accordance with the invention for a motor vehicle friction clutch.
Figure 2:
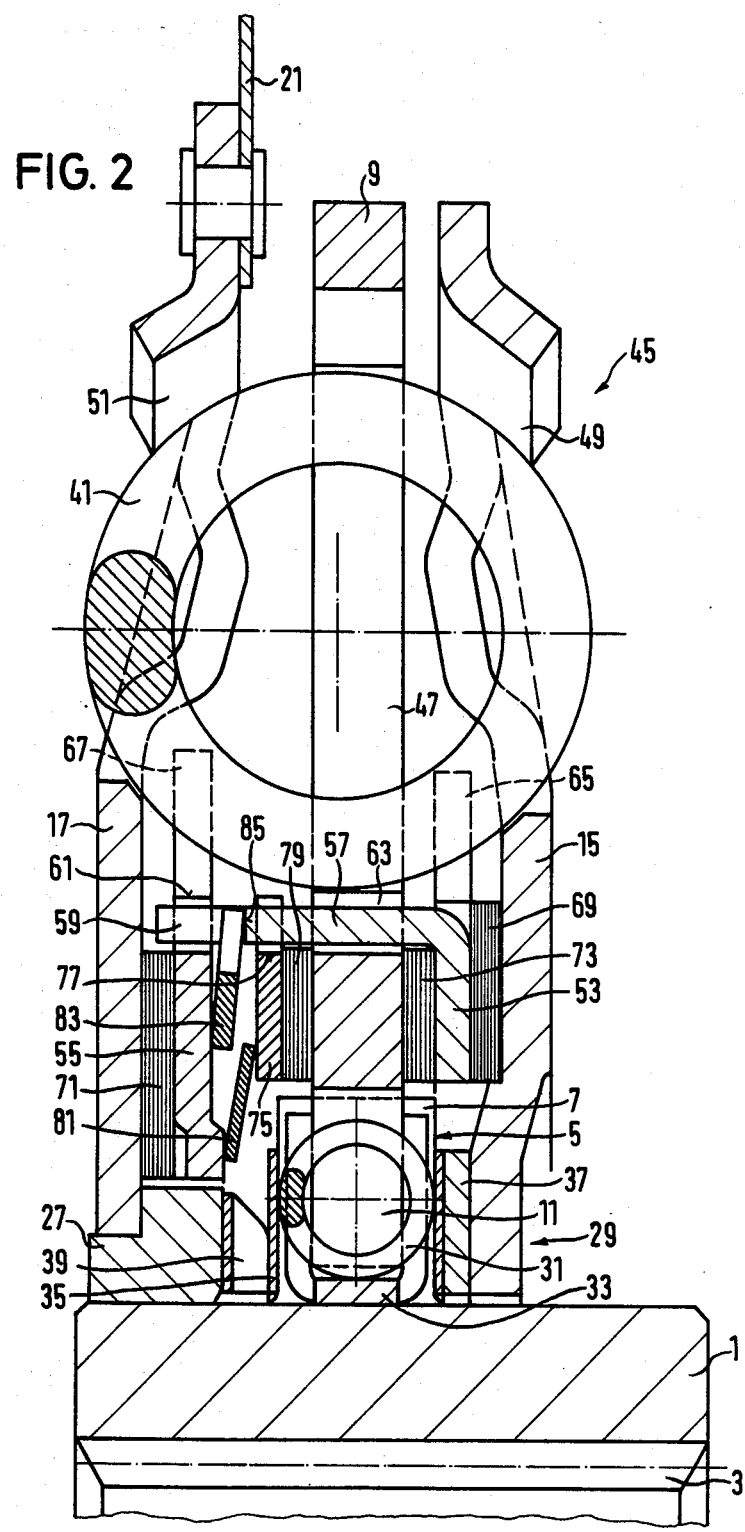
FIG. 2 shows an axial longitudinal section through one half of the clutch disc according to FIG. 1, seen along a line II—II.

The clutch disc according to FIGS. 1 and 2 has a hub 1 of substantially sleeve form which can be coupled non-rotatably but axially displaceably with an input shaft (not shown) of a motor vehicle gear, through an internal toothing 3. The hub 1 carries a radially protruding hub flange 5 with an external toothing 7. An annular disc part 9 enclosing the hub flange 5 engages with an internal toothing 11 non-rotatably but with a play 13 in rotation in the external toothing 7. Axially on both sides of the disc part there are arranged side discs 15, 17 which are connected with one another into one unit through distance rivets 19. The side disc 17 carries clutch friction linings 23, by means of a lining carrier 21. The distance rivets 19 pass through apertures 25 of the disc part 9 and limit the angle of rotation of the clutch friction linings 23 in relation to the disc part 9. The side disc 17 and thus the side disc 15 are mounted on the hub 1 through a bearing ring 27.

The clutch disc comprises an idling vibration damper 29, dimensioned for idling operation, with springs 31 which are braced in each by means of a retaining stirrup piece 33 between the external toothing 7 and the internal toothing 11. The springs 31 hold the disc part 9 in relation to the hub flange 5 in a rest position out of which it is rotationally elastically deflectable in both directions of rotation until the play 13 in rotation is taken up. The idling vibration damper 29 further comprises a friction device having a friction ring 35 arranged axially between the hub flange 5 and the side disc 17, a friction ring 37 arranged axially between the hub flange 5 and the side disc 15 and an axially acting spring 39, here a corrugated spring. The corrugated spring 39 is supported through the bearing ring 27 on the side disc 17 and generates the pressing force of the friction device of the idling vibration damper 29.

The side discs 15, 17 are coupled rotationally elastically with the disc part 9 through several helical compression springs 41, 43 of an under-load vibration damper 45 dimensioned for operation under load. The helical compression springs 41 are seated in windows 47 of the disc part for the one part and windows 49, 51 of the side discs 15 and 17 respectively for the other part, and are resiliently stressed in the relative rotation of the side discs 15, 17 and of the disc part 9. The window 47 of the disc part 9 is longer in the circumferential direction than the helical compression spring 41, so that the spring 41 seated in the windows 49, 51 can travel an idle distance before it abuts on the window 47. Thus the side discs 15, 17 can be rotated through a predetermined angle of rotation in relation to one another before the spring 41 is stressed. The windows of the side discs 15, 17 and of the disc part 9 allocated to the helical compression spring 43 are so dimensioned that the spring 43 is stressed at every relative rotation of the side discs 15, 17 and of the disc part 9. The springs 43 hold the disc part 9 in relation to the side discs 15, 17 in a rest position out of which it is deflectable in both directions of rotation, taking up the movement play of the springs 41 in the windows 47. The springs 41, 43 thus form a two-stage vibration damper the first stage of which is determined by the spring characteristics of the spring 43 and the second stage of which is determined by the spring characteristics of the springs 41, 43 arranged in parallel with one another.

The under-load vibration damper further comprises a two-stage friction damper. The friction damper comprises a first control disc 53 axially between the disc part 9 and the side disc 15 and a second control disc 55 axially between the disc part 9 and the side disc 17. The control discs 53, 55 are connected non-rotatably but axially movably with one another through axial tabs 57 of the control disc 53. For this purpose the tabs 57 engage with noses 59 formed on their free ends in apertures 61 of the control disc 55. The tabs 57 pass through apertures 63, defined in the circumferential direction, on the radially inner margin of the windows 47 of the disc part 9. The apertures 63 are dimensioned so that the two control discs 53, 55 can rotate in relation to the disc part 9 through an angle of rotation which is equal to the idle rotational travel of the springs 41 in the windows 47. The control discs 53, 55 have circumferentially spaced radially protruding extensions 65 and 67 respectively which each in pairs enclose the spring 41 in the cirumferential direction between them. The extensions 65, 67 couple the control discs 53 and 55 in the circumferential direction to the end faces of the spring 41.

As FIG. 2 shows, a friction ring 69 is arranged axially between the side disc 15 and the control disc 53 and a friction ring 71 is arranged axially between the side disc 17 and the control disc 55. A further friction ring 73 is arranged axially between the disc part 9 and the control disc 53. Axially between the control disc 55 and the disc part 9 there is provided a thrust ring 75 which is guided by means of apertures 77 of its external circumference non-rotatably but axially movably on the tabs 57. A friction ring 79 is seated axially between the thrust ring 75 and the disc part 9. An axially acting spring, here a dished spring 81, is braced in axially between the thrust ring 75 and the control disc 55. A second axially acting spring, for example a dished spring 83, is braced in axially between the control disc 55 and stop shoulders 85, facing axially towards the control disc 55, of the tabs 57. The dished spring 83 concentrically encloses the dished spring 81 and generates a higher axial force than the dished spring 81. Furthermore by reason of their friction pairings with adjacent discs, the friction rings 69, 71 generate a higher friction torque than do the friction rings 73, 79.

The vibration dampers 29, 45 of the clutch disc work as follows:

In a first range of relative angle of rotation only the idling vibration damper 29 is effective. In this range the side discs 15, 17 and the disc part 9 form a rigid unit which is connected rotationally elastically through the springs 31 with the hub 1. The idling vibration damper 29 is bridged over after the play 13 in rotation is taken up, and rotational vibrations are damped by the under-load vibration damper 45. On increase of the relative rotation firstly the spring 43 is stressed, while the spring 41 held in the windows 49, 51 of the side discs 15, 17 is moved freely in the window 47. The control discs 53, 55, which are coupled through their extensions 65, 67 to the spring 41, move together with the side discs 15, 17. In this first stage of the under-load vibration damper the friction torque is determined by the friction rings 73, 79 and the dished spring 81. When the idle travel of the spring 41 in the window 47 is taken up, the tabs 57 strike upon the end walls of the apertures 63 and the control discs 53, 55 are held fast in relation to the disc part 9. On further increase of the relative angle of rotation between the side discs 15, 17 and the disc part 9, the spring 41 is resiliently stressed in addition to the spring 43. In this range of rotation angle, defining the second stage of the under-load vibration damper, the friction torque is fixed by the friction rings 69, 71 and the two dished springs 81, 83. Reverse rotation of the side discs 15, 17 in relation to the hub 1 takes place analogously.

Figure 3:
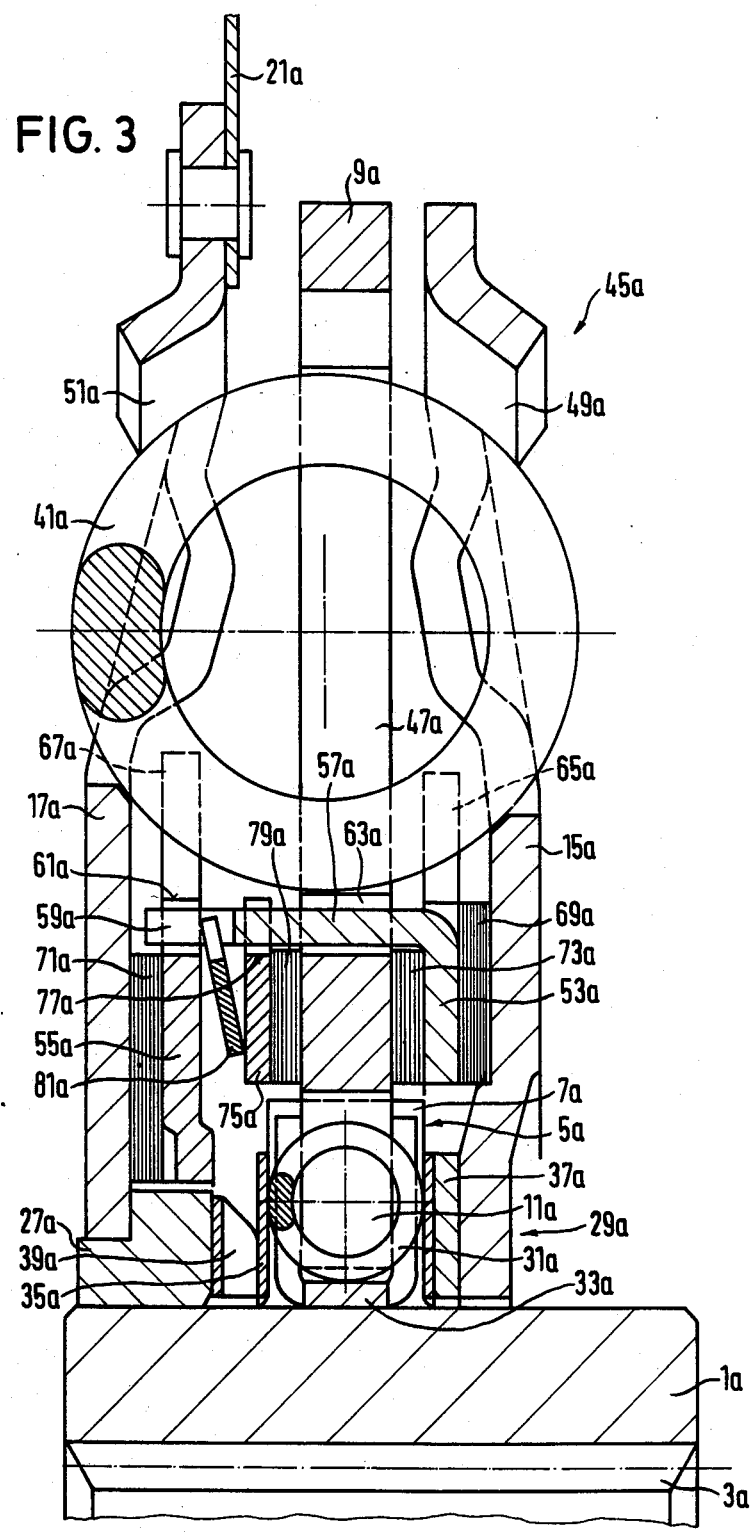
FIG. 3 shows an axial longitudinal section through one half of a variant of a clutch disc for a motor vehicle friction clutch.

In the clutch disc according to FIGS. 1 and 2 the pressure force applied to the friction rings 73, 79 is determined by the dished spring 81 and the pressure force applied to the friction rings 69, 71 is determined by the force of the dished springs 81, 83 arranged in parallel. In this manner it is possible to generate different friction torques even in the case of otherwise equal friction pairings of the friction rings 69, 71, 73 and 79. FIG. 3 shows a variant of a clutch disc which differs from the clutch disc according to FIGS. 1 and 2 merely in that the pressure application forces of the friction device of the under-load vibration damper are generated by one single spring. Parts of like effect are designated in FIG. 3 with the reference numerals of FIGS. 1 and 2 and additionally by the letter a. For the explanation of the assembly and manner of operation reference is made to the description of FIGS. 1 and 2.

The dished spring 81a braced in between the thrust disc 75a and the control disc 55a as sole spring generates the pressure force applied to the friction rings 69a, 71a, 73a and 79a. The dished spring 81a lies with its external circumference on the control disc 55a and is connected through the noses 59a of the tabs 57a non-rotatably with the control discs 53a, 55a. In order to generate different friction torques in the two stages of the under-load vibration damper 45a, the friction pairings of the friction rings 69a, 71a are dimensioned for a greater friction torque than are the friction pairings of the friction rings 73a, 79a.

Figure 4:
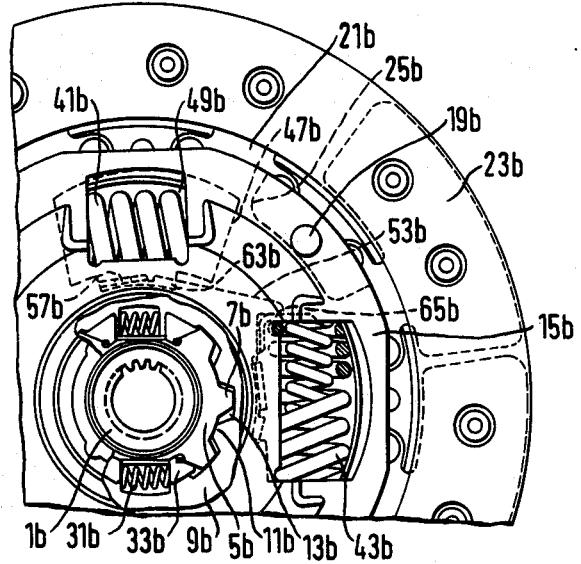
FIG. 4 shows a partial axial view of a further variant of a clutch disc for a motor vehicle friction clutch.

FIG. 4 shows a further variant of a clutch disc in the under-load vibration damper of which one of the two arrangements as explained above can be used according to choice for the generation of the pressure application force of under-load friction devices. In FIG. 4 parts of like effect are provided with the reference numerals of FIG. 1 and additionally with the letter b. The clutch disc otherwise corresponds to the clutch disc according to FIGS. 1 to 3. For explanation reference is made to the description of FIGS. 1 to 3.

In departure from the clutch discs of FIGS. 1 to 3 the control disc 53b (and analogously the second control disc (not shown)) is coupled with the helical compression spring 43b, which is stressed in the entire range of relative angle of rotation of the under-load vibration damper, through a single extension 65b which is effective in only one of the two relative directions of rotation. The spring 41b, which is effective in the second stage of the under-load vibration damper, is held in this embodiment again with movement play in a window 47b of the disc part 9b. In this way a damping behavior differing for the two directions of roration is obtained in a two-stage under-load vibration damper. The idling vibration damper of this clutch disc corresponds to the idling vibration damper of FIGS. 1 to 3.

While specific embodiments of the invention have been shown and described in detail to illustrate the application of the inventive principles, it will be understood that the invention may be embodied otherwise without departing from such principles.

We claim:
1. In a clutch disc for a motor vehicle friction clutch, comprising:
(a) a hub defining an axis of rotation,
(b) a disc part enclosing the hub and protruding substantially radially therefrom, said disc part being coupled with predetermined play in rotation but otherwise non-rotatably with the hub through a toothing, (c) two side discs arranged on axially opposite sides of the disc part and connected into one unit which is mounted rotatably on the hub through a limited first angle of rotation in relation to the disc part, (d) an idling vibration damper having at least one spring coupling the disc part rotationally elastically with the hub, (e) an under-load vibration damper having a plurality of springs arranged in windows of the disc part and of the two side discs and coupling the side discs rotationally elastically with the disc part, and having a friction device effective between the side discs and the disc part, (f) clutch friction linings held on one of the side discs, the improvement of said under-load vibration damper comprises:

(g) two control discs arranged on axially opposite sides of the disc part between the disc part and one each of the side discs, said control discs being connected non-rotatably with one another through connecting elements passing axially through openings of the disc part, the openings and the connecting elements limiting the relative rotation between the control discs and the disc part to a second angle of rotation smaller than the first angle of rotation, and at least one of said two control discs comprising at least one radially protruding extension co-operating with one of said springs of the under-load vibration damper, (h) first friction rings in each case axially between each side disc and an axially adjacent one of said two control discs, (i) a thrust ring, coupled non-rotatably but axially displaceably with the control discs, axially between a first of the two control discs and the disc part, (j) second friction rings axially between a second of the two control discs and the disc part and axially between the thrust ring and the disc part, (k) a first axially acting spring braced in axially between the first control disc and the thrust ring, and (l) the connecting elements are formed as tabs protruding axially from the second control disc, said tabs comprising stop shoulders facing towards the first control disc axially between the disc part and the first control disc, the first control disc being coupled non-rotatably but axially movably with the tabs, and wherein a second axially acting spring is braced in between the first control disc and the stop shoulders.

2. A clutch disc according to claim 1, wherein the friction torque which can be transmitted by the first friction rings between the side discs and the control discs is greater than the friction torque which can be transmitted between the disc part and the second control disc and the thrust ring.

3. A clutch disc according to claim 1, wherein said first spring is braced in between the first control disc and the thrust ring and the force of the second spring is greater than the force of the first spring.

4. A clutch disc according to claim 3, wherein the second spring concentrically encloses the first spring.

5. A clutch disc according to claim 1, wherein at least one of said springs of the under-load vibration damper is displaceable without stress in one of the windows of the disc part in the circumferential direction in accordance with the second angle of rotation, said control discs having a plurality of said extensions co-operating with said displaceable spring.

6. A clutch disc according to claim 5, wherein at least one of the control discs comprises extensions spaced in the circumferential direction on both sides of said displaceable spring.

* * * * *